United States Patent [19]

Patterson

[11] 4,192,544
[45] Mar. 11, 1980

[54] TELESCOPING EXTENSION FOR VEHICLES

[76] Inventor: Lewis K. Patterson, 4025 Pine Ridge Dr., Lilburn, Ga. 30247

[21] Appl. No.: 921,741

[22] Filed: Jul. 3, 1978

[51] Int. Cl.² ............................................. B60P 3/32
[52] U.S. Cl. ...................................... 296/165; 52/67; 296/175
[58] Field of Search ............... 296/23 R, 23 C, 23 F, 296/23 G, 26, 164, 165, 175, 176; 52/67

[56] References Cited
U.S. PATENT DOCUMENTS

| 3,116,085 | 12/1963 | Uttley | 296/26 |
|---|---|---|---|
| 3,740,088 | 6/1973 | Ratcliff | 296/23 C |
| 4,128,269 | 12/1978 | Stewart | 296/23 C |

Primary Examiner—Joseph F. Peters, Jr.
Assistant Examiner—Michael Mar
Attorney, Agent, or Firm—James B. Middleton

[57] ABSTRACT

A telescoping vehicle extension for mounting on a vehicle, the vehicle extension being receivable over the vehicle with the walls of the vehicle extension outwardly of the walls of the vehicle to define storage spaces therebetween, pivotal floor members for the vehicle extension being selectively disposable within the storage spaces, and tables and beds being pivotally carried by the walls of the vehicle extension and storable within the storage spaces.

7 Claims, 8 Drawing Figures

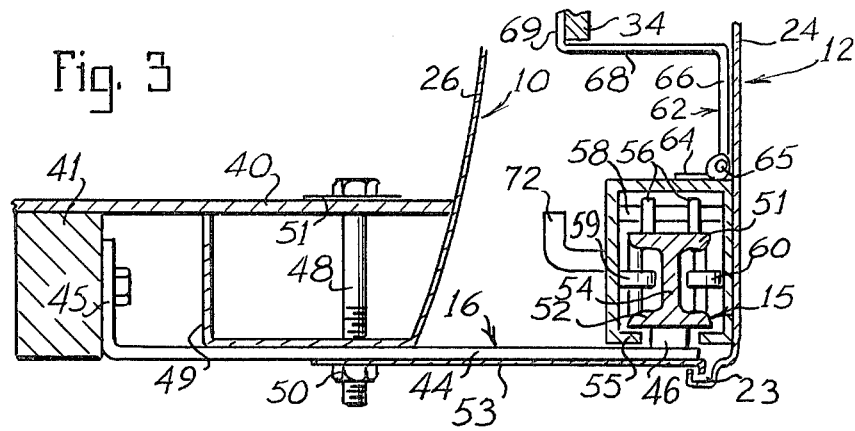
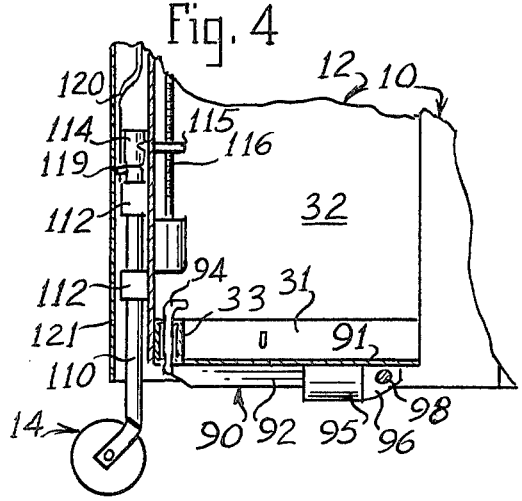
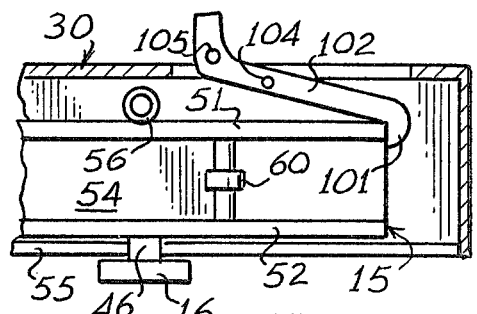
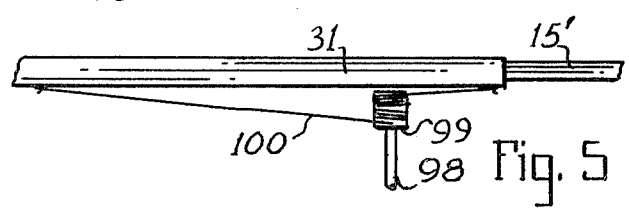
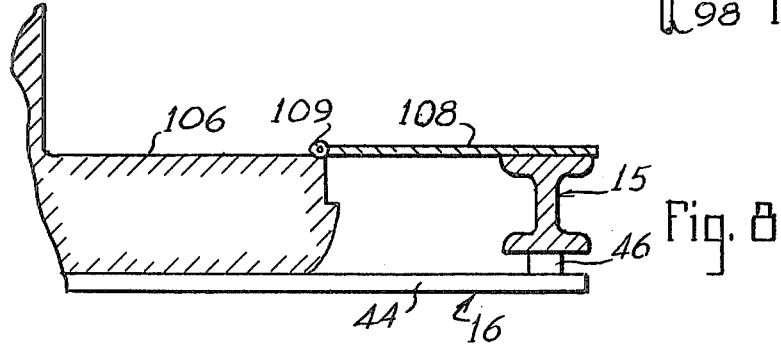

TELESCOPING EXTENSION FOR VEHICLES

This invention relates generally to extensions for vehicles, and is more particularly concerned with a telescoping extension for vehicles which is adapted to be supported totally by the vehicle when in the telescoped position.

With the great popularity of recreational vehicles of numerous varieties, there have been increasing efforts to provide larger and larger vehicles to accommodate a larger group of people for sleeping and caring for the general necessities of life. The large size is required both because of large groups of adults who may wish to camp together, and because of the popularity of family camping so that a single vehicle must accommodate an entire family regardless of the size of the family. Furthermore, vans and similar vehicles are being increasingly used for business wherein a person may wish to have a mobile office, showroom or the like, and a large amount of space may be required for the desired reception room, showroom, etc.

There is of course a practical limitation to the size of a single vehicle, such as a van, due to the considerations of driving the vehicle on roads in the midst of other traffic; and, one must consider that the vehicle will frequently be driven off the roads into rough areas so that considerable ground clearance may be required. An extremely long vehicle with an extremely long wheel-base of course militates against such usage.

The most common and obvious solution to the problem of gaining more space for vehicles has been the use of a trailer towed by the vehicle. Though there are numerous disadvantages to the use of a trailer, one of the large disadvantages is that a trailer pulled behind a vehicle such as a van is difficult to manipulate on the highway. Both the length of the vehicle plus the trailer and the fact that the vehicle and the trailer are hinged with respect to each other render the vehicle difficult to handle so great skill is required. Additionally, the pulling of a trailer behind a van or other such vehicle severely reduces the fuel mileage achieved by the vehicle. In addition to these disadvantages, it will be understood that there will be two completely separate compartments for sleeping, eating and the like, and one will have to go outside one section of the vehicle to enter the other section of the vehicle. Another means that has been attempted to increase the size of a vehicle is to provide a telescoping section so that a single vehicle can be extended and contracted. The closest prior art known to the applicant which discloses a telescoping vehicle is the U.S. Pat. No. 3,116,085. This patent discloses a telescoping section for the trailer of a semitrailer truck; however, the device requires the use of a central partition extending generally longitudinally of the telescoping section which would be quite inconvenient for normal living since the space becomes two narrow passageways. Another prior art reference that shows generally comparable construction is U.S. Pat. No. 3,740,088 which discloses a pair of telescoping sections on a trailer. The sections, however, are hardly more than small canopies that can be positioned outwardly of the trailer for receiving a small table, bunk bed or the like, and would not be suitable for effecting a reasonable increase in the size of a vehicle. Other telescoping vehicles are extremely complex and would be very expensive while yielding only a small increase in useable space.

The present invention overcomes the above mentioned and other difficulties with the prior art by providing, in conjunction with a vehicle, a telescoping section movably mounted on support means carried by the vehicle, the telescoping section, or vehicle extension, being wider than the vehicle to provide space at each side of the vehicle between the vehicle walls and the vehicle extension walls. A floor is provided for the vehicle extension, the floor being pivotally mounted for storing within the space between the vehicle wall and the vehicle extension wall when the vehicle extension is in telescoped position. The vehicle extension may also include beds, tables and the like pivotally secured to the vehicle extension walls and storable within the space between the vehicle walls and the vehicle extension walls. More specifically, the present invention includes a pair of rails carried by the vehicle at each side thereof, longitudinally of and parallel to the vehicle, the telescoping extension including bearing means for engaging the rails. Support means are provided at the rear end of the telescoping extension during the extending of the telescoping section, and while the telescoping section is fully extended. The present invention therefore provides a telescoping extension in combination with a van or similar vehicle so that a continouous space is provided from the van into the telescoping section such that a single, large living space is provided when the telescoping section is extended, and a relatively compact road vehicle is provided when the telescoping section is telescoped, to be carried entirely by the vehicle.

These and other features and advantages of the present invention will become apparent from consideration of the following specification when taken in conjunction with the accompanying drawings in which:

FIG. 3 is a detail view showing the mounting of the rail, and the pivotal construction of the floor for the vehicle extension;

FIG. 4 is a longitudinal cross-sectional view showing a transitional platform used in installing the vehicle extension shown in FIG. 1, and showing one form of rear support wheel for use in the present invention;

FIG. 5 is a fragmentary top plan view showing the cable arrangement for extending and telescoping the vehicle extension shown in FIG. 1;

FIG. 7 is an enlarged detail view showing one form of safety latch for retaining the vehicle extension in telescoped position; and, FIG. 8 is an enlarged cross-sectional view taken substantially along the line 8—8 in FIG. 1 and showing a foldable step for the vehicle having the vehicle extension mounted thereon.

Figure 1:
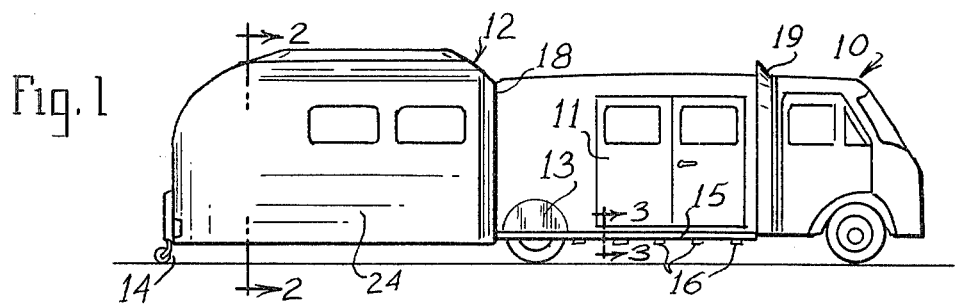
FIG. 1 is a side elevational view showing one form of vehicle having a vehicle extension made in accordance with the present inventions installed thereon, the vehicle extension being shown in fully extended position.

Referring now more particularly to the drawings and to that embodiment of the invention here chosen by way of illustration, FIG. 1 shows a van-type truck 10 of the currently popular style, which will be hereinafter referred to as a van. The van 10 has side doors 11; however, it will be understood that the variety of van having a single, large side door is equally useable with the vehicle extension of the present invention. The van 10 is here shown as having a vehicle extension 12, made in accordance with the present invention mounted thereon and shown in its fully extended position. Retractable support wheels 14 are carried at the rear of the vehicle extension 12 for supporting the rear of the vehicle extension 12 as required.

Along the lower edge of the van 10 there is a support rail 15 which is fixed with respect to the van 10 by means of a plurality of spaced brackets 16. Generally, it will be understood that the vehicle extension 12 is arranged so that the vehicle extension 12 will ride along the rails 15, the rearmost end of the extension 12 being carried by the wheels 14. The extension 12 will move forward until the forwardmost edge 18 of the vehicle extension 12 is fully engaged with the fixed sealing strip 19 fixed to the van 10. Clamp means are provided for retaining the vehicle extension 12 in its telescoped position in which the vehicle extension will be fully carried by the van 10, and the wheels 14 will be retracted.

Figure 2:
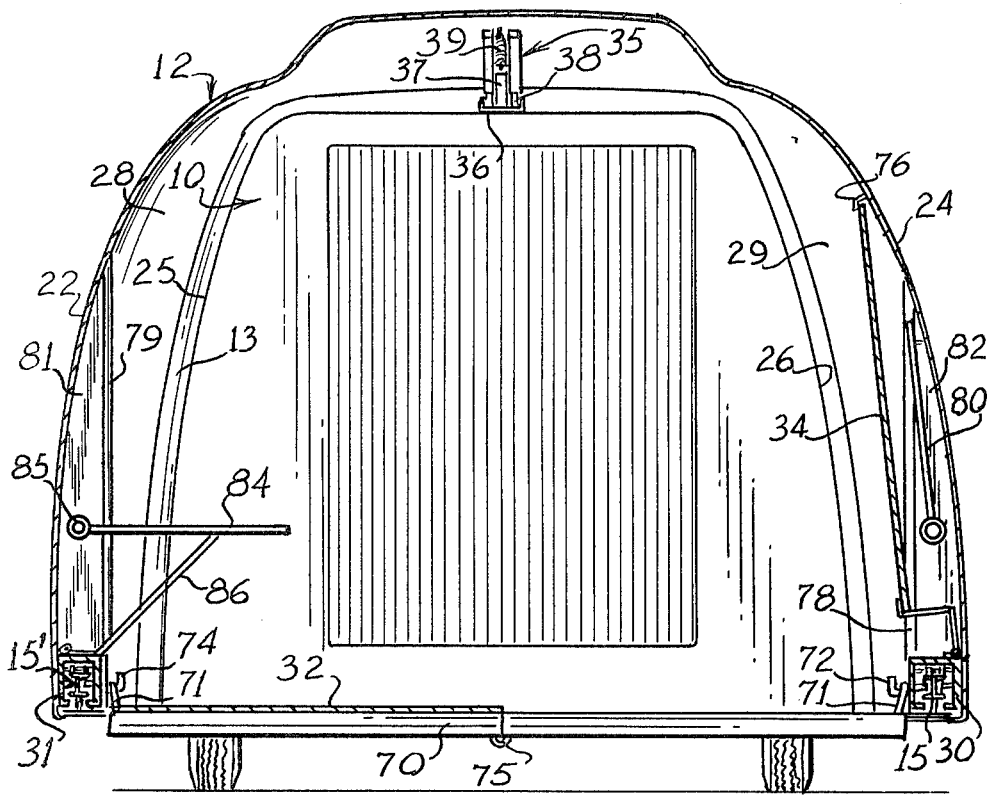
FIG. 2 is an enlarged cross-sectional view taken substantially along the line 2—2 in FIG.1.

Referring now to FIG. 2 of the drawings it will be seen that the leading edge 18 of the vehicle extension turns inward to be closely adjacent to the body of the van 10, and is provided with appropriate sealing, or weather stripping 13. Rearwardly of the leading edge 18, the vehicle extension walls 22 and 24 are spaced outwardly of the walls 25 and 26 of the van 10. This leaves storage spaces 28 and 29 at each side of the van 10 and within the vehicle extension 12.

It will also be seen in FIG. 2 of the drawings that the rails, such as the rail 15, are the primary load bearing means for the vehicle extension 12. There is a rail at each side of the vehicle 10, one rail being designated at 15 and the other being designated as 15'. The lower edges of the vehicle extension 12 have structual members, here designated as 30 and 31, adapted to receive the rails 15 and 15' respectively. Thus, the members 30 and 31 act both as structual members which constitute the base for the vehicle extension and as bearing members for riding on the rails 15 and 15'.

As best shown in FIG. 2 of the drawings, the floor for the vehicle extension 12 is hinged with respect to the walls 22 and 24 of the extension 12, and is selectively placeable either in a horizontal position for use as a floor, as shown by the floor member 32, or in a generally vertical position for storage when the extension 12 is telescoped, as shown by the floor member 34.

Figure 6:
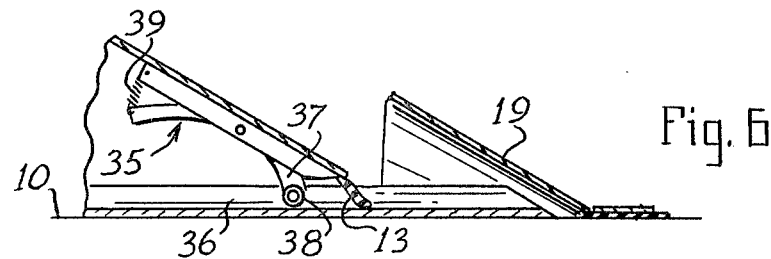
FIG. 6 is an enlarged longitudinal cross-sectional view showing the seal between the vehicle and the vehicle extension, and showing an alignment means.

To cause the upper portion of the vehicle extension 12 to move smoothly back and forth without dragging due to warping of the extension 12, there is a guide means generally designated at 35, and best shown in FIGS. 2 and 6 of the drawings. The guide means 35 includes a channel 36 fixed to the roof of the vehicle 10 and longitudinally conforming thereto, and a roller 38 on an arm 37 which is carried by the vehicle extension 12 for riding in the channel 36. The roller 38 is spring urged into the channel 36 by a spring 39 to assure that the roller 38 remains in the channel 36, while allowing the roller 38 to move up and down to follow the contour of the top of the van 10.

Referring to FIG. 3 of the drawings, the vehicle 10 is shown fragmentarily, including the lower portion of the wall 26, a portion of the floor 40, and a portion of the main vehicle frame 41. It will here be seen that the bracket 16 includes a generally flat bar 44 having an end flange 45 turned up and bolted to the frame 41. The outermost, extending, end of the bar 44 carries the rail 15 with a spacer 46 between the rail 15 and the bar 44.

Since the rail 15 carries the weight of the vehicle extension 12, and the inner end of the bar 44 is fixed to the frame member 44, the bar 44 will tend to rotate in a clockwise direction as viewed in FIG. 3, the axis of rotation being at the frame member 41. To assist in holding the bracket 16 in place, therefore, a bolt 48 or other fastening means is passed through the floor 40 of the vehicle 10, through the body portion 49 of the vehicle 10, through the bar 44, and a nut 50 is received on the bolt 48. Washers 51 may be used as needed.

With the construction described it will be understood that the bar 44 is carried by the frame 41 of the vehicle 10, and the bar 44 carries the rail 15 at its outer end. To resist the downward force, the bolt 48 is provided generally mid-way of the bar 44. This construction allows the bracket 16 to be connected directly to the frame of the vehicle, but provides intermediate support so lighter material can be used as the bar 44.

It will be noted that nuts and bolts are shown as fastening means for the bracket 16. Obviously the bracket 16 could equally well be fixed to the vehicle 10 by welding, riveting or the like; however, it is contemplated that one may exchange the vehicle 10 and wish to retain the vehicle extension 12. The use of releasable fastening means such as nuts and bolts allows a relatively simple transfer of the vehicle extension from one vehicle to another.

The construction of the rail 15 and the cooperating bearing arrangement is best shown in FIG. 3 of the drawings. The rail 15 as here shown comprises an I-beam having an upper flange 51 and a lower flange 52 with a central web 54. The lower flange 52 is attached by the spacer 46 for mounting the rail 15 on the bracket 16. The structual member, or bearing member, 30 is essentially a rectangular tubing having a portion of the bottom wall 55 removed to provide a slot for the spacers 46 on the brackets 16.

Within the member 30 and above the rail 15, there are roller means 56, here shown as a pair of rollers, or wheels, mounted on a transverse axle 58. It will be readily seen that these rollers 56 transfer the weight from the member 30 to the upper flange 51 of the rail 15. Also within the member 30 there are additional roller means 59 and 60 which are shown as mounted on axles which extend between the upper and lower flanges 51 and 52 of the rail 15. The arrangement is such that the roller means 59 and 60 engage the side walls of the member 30 to maintain lateral alignment of the member 30.

It should be understood that there is a plurality of roller means such as the roller means 56, and a plurality of roller means such as the roller means 59 and 60, the roller means 56 being distributed along the length of the member 30 for engaging the top flange 51 of the rail 15, and the roller means 59 and 60 being distributed along the rail 15 for engaging the side walls of the member 30. With this in mind, it should be understood that the object of the construction described is to provide means for facilitating relative motion between the rail 15 which is fixed relative to the vehicle 10 and the structural member 30 which is fixed relative to the vehicle extension 12. As a result, many forms of rollers or other bearing means may be provided, and the rail 15 may take any of numerous forms. Also, it should be understood that the rail 15' and its cooperating structural member 31 are constructed the same as the rail 15 and structural member 30 so the description will not be repeated.

With the foregoing description in mind, it will be understood that the spaces between the vehicle walls 25 and 26 and the vehicle extension walls 22 and 24 are used for storage of beds, tables, floor members and the like. As a result, the spaces should be kept free of dirt and road film as much as possible, so the area between the walls is closed by a bottom plate such as the plate 53 shown in FIG. 3 of the drawings. This bottom plate 53 is shown as having a slidable junction 23 with the wall 24 of the vehicle extension 12. Further, since the rear wheel of the vehicle would otherwise be in communication with the storage spaces 28 and 29, a rather conventional wheel skirt 13 is placed over the rear wheel.

FIG. 3, taken in conjunction with FIG. 2 provides a good disclosure of the floor which has been described briefly hereinabove. In FIG. 3 it can be seen that a hinge generally designated at 62 has one leaf 64 fixed to the upper surface of the structural member 30, with the barrel 65 adjacent to the wall 24 of the vehicle extension 12. The opposite leaf of the hinge 62 has a first section 66 of sufficient length to extend from the barrel 65 to the inner edge of the member 30. The leaf then turns at a right angle for a second section 68 which is of sufficient length to extend approximately the height of the member 30. The third, and final, section 69 of the hinge 62 is parallel to the first section 66 for attachment to the floor member 34.

Considering the arrangement of the hinge 62, it should now be seen that the hinge can be folded so that the section 66 lies parallel, and across, the member 30, the section 68 extends down the inner side of the member 30, and the final section 69 supports the floor member 34 approximately at the lower edge of the member 30, the floor extending across the vehicle extension 12 as best shown in FIG. 2 with reference to the floor member 32. It will therefore be seen that the floor members 32 and 34 can be put in position as shown by the floor member 32 in FIG. 2 of the drawing to be used as a floor, or the floor members 32 and 34 can be raised, pivoting about the barrel 65 to be stowed adjacent to the wall 24 of the vehicle extension 12.

It will be obvious that the hinge arrangement just described would not be sufficient in itself to support the central section of the floor members 32 and 34, so additional support means are required. These support means are illustrated in FIG. 2 of the drawing and designated at 70. The member 70 includes a hanger 71 at each end thereof adapted to engage hooks 72 and 74 which are fixed to the members 30 and 31 respectively. The member 70 is therefore simply put into place by placing the hangers 71 over the hooks 72 and 74. A beam, or sill, is thus provided to support the floor members 32 and 34.

For convenience, it will be seen in FIG. 2 that a hinge 75 is indicated substantially centrally of the member 70. The hinge 75 will allow the member 70 to be folded in half for easier storage when the vehicle extension 12 is to be telescoped over the vehicle 10. Though numerous particular arrangements may be used, the arrangement here shown is simply a hinge placed on the bottom of the member 70, and the edges of the member 70 abut each other to prevent the member 70 from bending in the opposite direction.

When the floor members 32 and 34 are raised to be placed in the position shown for the floor member 34, it will be understood that there is a latch 76 to hold the floor in position. The latch 76 can take any of numerous forms, the particular variety of latch not being a part of the present invention.

It will also be seen in FIG. 2 of the drawing that a reinforcing strut 78 extends from the member 30, generally vertically, to engage the side wall 24 of the vehicle extension 12. A comparable strut 79 extends from the member 31 generally vertically to engage the wall 22 of the vehicle extension 12. Between the struts 78 and 79, and the walls 22 and 24 respectively, there are solid members 80 and 81 which serve on the one hand to stress the sides 22 and 24 of the vehicle extension 12 to maintain the shape of the sides and prevent undue bending and flexing due to wind currents, and on the other hand to provide mounting means for beds, tables, and the like.

A first platform 82 is shown in folded position behind the floor member 34, and a second platform 84 is shown in position for use above the floor member 32. It will be understood that the platform 84 is pivoted at 85 and may include an appropriate support brace or the like 86 for the needed strength. The platforms 82 and 84 are shown here as plain platforms, but those skilled in the art will readily understand that the platforms may be used as beds, tables, desks or the like depending on the particular use to which the vehicle extension 12 may be put. In the event the platforms 82 and 84 are to be used as beds, it will be understood that a mattress made of an expanded plastic material, such as expanded polyurethane can be fixed to the upper surface of the platform; and, when the platform is put into stowed position as shown by the platform 82, the polyurethane mattress could simply be compressed to fit within the necessary space. It will be understood that a polyurethane mattress could be compressed and left in that condition for an extended period of time, but would regain its normal condition in a short time after being released.

FIG. 4 of the drawing shows a transitional platform utilized in mounting the vehicle extension 12 on a vehicle 10. The platform generally designated at 90 includes a floor section 91 supported by support members 92. The support members 92 extend forwardly to attach to the frame or other appropriate members beneath the vehicle 10. It will therefore be understood that the platform 90 remains in place with respect to the vehicle 10 whether the vehicle extension 12 is extended or telescoped. It is contemplated that this additional space for the vehicle 10 will be utilized for a shower at one side of the vehicle 10, and perhaps toilet facilities at the opposite side of the platform 90. This could be done leaving a passageway between the shower and the toilet facilities for passage from the vehicle 10 to the vehicle 12. It will of course be recognized that numerous other uses may be made of this particular space, including simply allowing the interior of the vehicle extension 12 to be somewhat larger.

In FIG. 4, the rear platform 90 is shown with the vehicle extension 12 in its telescoped position so that the rearmost frame member 33 is at the end of the platform 90. It will be understood that the frame member 33 is a continuation of the members 30 and 31, the members 30, 31 and 33 forming a U-shape to provide an integrated frame for the vehicle extension 12. With this in mind, it will be seen that the rearmost member 33 is brought forward towards the platform 90, and the frame member 33, in its forwardmost position is placed on the rear ends of the members 92. This arrangement allows the platform 90, which is to say the frame of the vehicle 10, to carry the weight of the rearmost end of the vehicle extension 12; and, this arrangement also allows the use of safety latches to prevent inadvertent extension of the vehicle extension 12. Though the latches may take any of numerous forms, a very simple variety is here shown including simply a bolt 94 extending through the frame member 33 and into to the member 92.

Beneath the platform 90, there is a motor 95 having a gear box 96 and a transverse shaft 98. The motor 95 would be a reversable electric motor operated from the electrical system of the vehicle, and would be used for assisting in the extending and telescoping of the vehicle extension 12. One very simple arrangement by which the motor 95 may assist in reciprocal movement of the vehicle extension 12 is shown in FIG. 5 of the drawings wherein the shaft 98 is shown with a drum 99 at the extending end thereof. A cable 100 is wrapped around the drum 99, and the ends of the cable 100 are fixed to the frame members 30 and 31, the frame member 31 being here shown.

Considering FIGS. 4 and 5 together, it will be understood that when the motor 95 is operated in one direction, the shaft 98 will be turned in one direction (for example, clockwise) so that the cable 100 extending to the rear end of the member 31 will be wrapped around the drum 99 to urge the frame member 31 to the right as viewed in FIG. 1. Simultaneously, the cable 100 will be unwrapped from the opposite end of the drum 99 to allow the right hand end of the frame member 31 to move towards the right as viewed in FIG. 5. This action will cause the vehicle extension 12 to be telescoped over the vehicle 10. When the motor 95 is operated in the opposite direction, the procedure just described will be reversed and the vehicle extension 12 will be extended outwardly from the vehicle 10.

Looking briefly at the FIG. 7 of the drawing, another form of latch is disclosed for assuring that the vehicle extension 12 will not inadvertently be extended from the vehicle 10. The latch in FIG. 7 includes a pawl 101 for engaging the forwardmost end of the rail 15. The pawl 101 is carried at the end of a lever 102 which is pivoted at 104 to the member 30.

As illustrated in FIG. 7, the lever 102 is arranged so that the pawl 101 will tend to engage the rail 15 under the influence of gravity, though it will be understood that the device may be spring urged if desired. To assure that the pawl 101 will stay in place when the vehicle 10 is on the road or the like, the rearmost end of the lever 22 is provided with an opening 105 to receive a safety pin. It will be seen that, if a pin is placed through the hole 105, the rear end of the lever 102 cannot move downwardly, which will prevent the pawl 101 from moving up and disengaging the rail 15. So long as the pawl 101 engages the end of the rail 15, the member 30 cannot move with respect to the rail 15 and the vehicle extension 12 cannot move with respect to the vehicle 10.

From FIG. 1 of the drawings it will be seen that when the vehicle extension 12 is extended from the vehicle 10, when a person wishes to enter or exit from the vehicle 10 by the side doors 11, the person will be inclined to use the rail 15 as a step. This will be undesirable both from the standpoint of the person since the rail 15 may be narrow, and in some instances may be rounded or otherwise shaped, and from the standpoint of the rail itself since it would be undesirable to have accumulations of dirt, mud and other debris on the rail 15 when the bearing member 30 telescoped over the rail 15. FIG. 8 of the drawings shows a very simple solution to this problem wherein a foldable step is provided throughout the length of the door 11. In FIG. 8, the conventional step of the vehicle is indicated at 106, and the rail 15 is shown adjacent thereto supported by the bracket 16. A step 108 is shown in a folded position, the step 108 including a hinge 109 so that the step 108 can be folded over to coincide with step 106. Thus, when the vehicle extension 12 is to be telescoped over the vehicle 10, the step 108 will be folded on the hinge 109 to overlap the step 106 to be completely out of the way and allow the doors 11 to close. On the other hand, when the vehicle extension 12 is extended rearwardly so that a person may wish to egress by the doors 11, the step 108 can be folded out, pivoting at the hinge 109 and being supported at its outer end by the rail 15. A very convenient step is then provided which also protects the rail 15.

The rear support wheels 14 may take virtually any form, the only intent being to support the rear of the vehicle extension 12 as needed. FIG. 4 of the drawings shows one form of rear support wheel 14 somewhat schematically.

In FIG. 4 it will be seen that the support wheel 14 includes a vertical shaft 110 having a wheel 111 at the lower end thereof. A pair of bearing members 112 supports the shaft 110 for both vertical and angular motion.

To adjust the vertical position of the shaft 110, the upper end of the shaft carries a hub 114 which is rotatably mounted with respect to the shaft 110. The hub 114 has an inwardly extending finger 115 which threadedly receives a shaft 116. The shaft 116 is drivingly connected to the shaft of the motor 118 so that, when the motor 118 is operated to rotate the shaft 116, the threaded shaft 116 will move the finger 115 up or down depending on the direction of the rotation of the motor 118. As the finger 115 moves up or down, the hub 114 will likewise be moved causing motion of the shaft 110.

As here shown, it is preferable that the wheel 111 be rotated approximately 90 degrees to be stored very snugly against the rear wall of the vehicle extension 12. To effect this rotation, the shaft 110 includes a cam follower 119 fixed thereto and extending into a cam way 120, the cam way 120 being formed interiorly of the housing 121 for the wheel 114.

It should now be understood that the motor 118 can be operated to rotate the shaft 116 and cause the finger 115, hence the hub 114, to move up from the position shown in FIG. 4 of the drawing. As the shaft 110 moves up, the cam follower 119 will move up the cam way 120 so that the wheel 111 will simply be moved up somewhat. As the cam follower 119 moves further up, the cam follower 119 will follow the cam way 120 around the housing 121 thereby to rotate the wheel 111 90 degrees so that the wheel 111 will be stored within the housing 121.

From the foregoing discussion, it should now be understood by those skilled in the art that the present invention provides a quite simple and efficient telescoping vehicle extension which can be carried completely by a vehicle for easy mobility, and can be extended from the vehicle to provide a considerable amount of additional space. The vehicle extension is extended from the vehicle but remains attached thereto so that the space within the vehicle extension and the space within the vehicle itself are in communication yielding effectively a single, large area. For telescoping the vehicle extension, the floor of the vehicle extension as well as beds, tables or the like can be folded against the walls of the vehicle extension and left in place so that the floor and beds or the like are carried within the storage space between the vehicle wall and the vehicle extension wall.

It will also be understood that the rear lights for the vehicle would be placed on the vehicle extension as shown in FIG. 1 of the drawings, the lights including all lights required by any local laws or ordinances or the like. The electrical power to these lights can be very easily provided by a cable on a reel as is well known in the art and is therefore not disclosed in detail in the present application.

It will of course be understood by those skilled in the art that the embodiment of the invention here chosen is by way of illustration only, and is meant to be in no way restrictive; therefore, numerous changes and modifications may be made, and the full use of equivalents resorted to without departing from the spirit or scope of the invention as defined in the appended claims.

I claim:

1. A telescoping vehicle extension for mounting on a vehicle having a vehicle body, generally parallel side walls, and a roof, said vehicle extension comprising a vehicle extension body having generally parallel side walls, said side walls of said vehicle extension being spaced outwardly of said side walls of said vehicle for defining storage spaces between said side walls of said vehicle and said side walls of said vehicle extension, rail means carried by said vehicle generally longitudinally of said vehicle, bearing means carried by said vehicle extension generally longitudinally of said vehicle extension for reciprocal engagement with said rail means, the arrangement being such that said vehicle extension is selectively extendible rearwardly of said vehicle and telescopable over said body of said vehicle, and further including a floor for said vehicle extension, said floor for said vehicle extension being pivotal mounted on to at least one of said side walls of said vehicle extension for selective disposition in a generally horizontal position for use as a floor and in a generally vertical position for storing within one of said storage spaces in the retracted position.

2. A telescoping vehicle extension as claimed in claim 1, said floor comprising a first floor member and a second floor member, said first floor member being pivotal with respect to one of said side walls of said vehicle extension and storable adjacent thereto in one of said storage spaces, said second floor member being pivotal with respect to the other of said side walls of said vehicle extension and storable adjacent thereto in the other of said storage spaces.

3. A telescoping vehicle extension as claimed in claim 2, and further including a platform pivotally carried by at least one of said walls of said vehicle extension, said platform being foldable against said at least one of said walls of said vehicle extension for storage in one of said storage spaces.

4. A telescoping extension as claimed in claim 1, said vehicle including a frame, said rail means being carried by said frame outwardly of said body of said vehicle and generally parallel to said frame, said bearing means being carried at the lower end of said walls of said vehicle extension.

5. A telescoping vehicle extension as claimed in claim 4, said vehicle extension further including a roof, the forwardmost ends of said roof and of said side walls of said vehicle extension being turned inwardly to be closely adjacent to said roof and said side walls of said vehicle, and a seal extending from said vehicle extension to sealingly engage said vehicle, and further including a sealing strip fixed to said vehicle, said sealing strip being adapted to receive said seal extending from said vehicle extension.

6. A telescoping vehicle extension for mounting on a vehicle having a body, generally parallel side walls, and a roof, said vehicle extension comprising a vehicle extension body having generally parallel side walls, said side walls of said vehicle extension being spaced outwardly of said side walls of said vehicle for defining storage spaces between said side walls of said vehicle and said side walls of said vehicle extension, rail means carried by said vehicle generally longitudinally of said vehicle, bearing means carried by said vehicle extension generally longitudinally of said vehicle extension for reciprocal engagement with said rail means, the arrangement being such that said vehicle extension is selectively extendible rearwardly of said vehicle and telescopable over said body of said vehicle, said vehicle including a frame, said rail means being mounted outwardly of said body of said vehicle and generally parallel to said frame, said bearing means being carried at the lower end of said side walls of said vehicle extension, and further including guide means for said vehicle extension, said guide means comprising a centrally located channel member fixed to said roof of said vehicle, and a centrally located roller carried by said vehicle extension in a recessed underportion thereof for riding in said channel member.

7. A vehicle extension as claimed in claim 6 and including at least one support wheel mounted on said vehicle extension, said support wheel being carried at the rear of said vehicle extension and selectively engageable with the ground for supporting said vehicle extension when said extension is in its extended position, means for raising said support wheel, and cam means for causing rotation of said support wheel when said support wheel has been raised to a predetermined extent.

* * * * *